May 10, 1966     H. G. SCHMITT     3,250,915
OZONE GENERATOR HOUSING
Filed Oct. 31, 1962
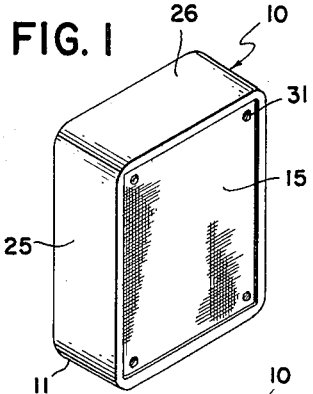
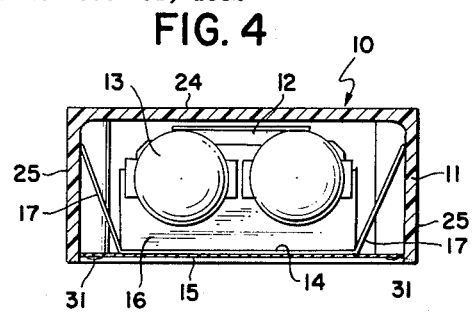
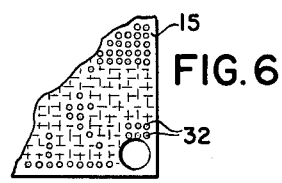
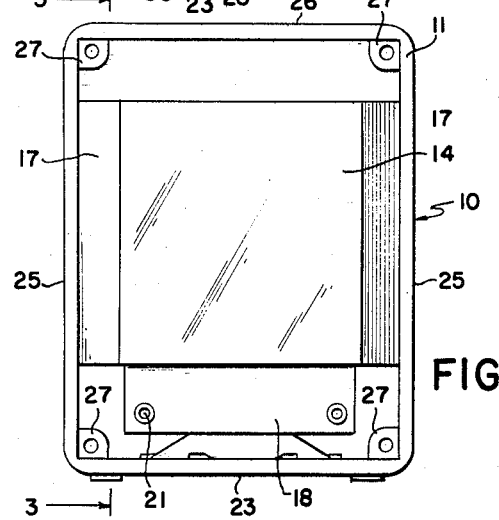
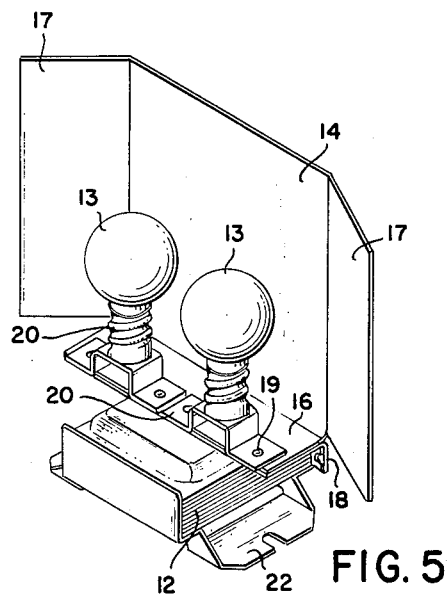
HANS GEORGE SCHMITT
INVENTOR.
BY
Adams, Forward and McLean
ATTORNEYS

United States Patent Office 3,250,915
Patented May 10, 1966

3,250,915
OZONE GENERATOR HOUSING
Hans George Schmitt, Wyckoff, N.J., assignor to Cybernetics, Inc., Paterson, N.J., a corporation of New Jersey
Filed Oct. 31, 1962, Ser. No. 234,387
2 Claims. (Cl. 250—43)

My invention relates to the conditioning of the air in homes, offices, laboratories and the like and in particular provides a device for the production of ozone which can be readily transported from one place to another, which is simple to manufacture and install and which can be constructed inexpensively.

As is well known the employment of ozone generating devices has found wide application for sanitary, therapeutic and other reasons since the creation of ozone in the atmosphere affords a control on germs, odors and other undesirable constituents of the atmosphere. Such devices, however, as are readily available today, are not only cumbersome and expensive, but require fans, blowers and other moving components which eventually wear out and require replacement and which frequently are objectionably noisy.

It is thus a principal object of my invention to provide a portable, silent, inexpensive ozone generator having no moving parts which will effectively and safely produce ozone in sufficient quantity for effective reduction in germs and odors in kitchens, offices, bedrooms, cellars and the like.

Thus, in accordance with my invention I provide an ozone generator utilizing ultra-violet radiation to produce the ozone and a particular construction for housing the ultra-violet light generator to induce air flow past the ultra-violet generator by convection such that a relatively small ultra-violet light source can be utilized to ozonize large volumes of air.

Thus, in accordance with my invention I provide a case having a closed bottom, sides, back and top, preferably formed as an integral unit, and having an open front. The ozone generating unit is positioned centrally in the case and typically utilizes one, two or four ultra-violet lamps preferably provided with a ballast, with the ballast being mounted inside the case on the bottom and the lamps mounted above the ballast. Such ultra-violet lamps and ballast are conventional equipment and form no part of my present invention except with regard to their positioning in the case and the fact that they are heat generators as well as ultra-violet light generators.

In accordance with my invention the forward portion of the case, that is, the portion of the interior of the case immediately adjacent its open front is provided with a deflector plate which extends across the open front of the case with the ultra-violet light generator immediately behind it and with the side edges of the plate touching the sides of the case while leaving an aperture above the plate and an aperture below the plate in the open front of the case. Preferably the plate is at its margins adjacent the sides of the case provided with reentrant wings by bending back such marginal portions. In this manner the deflector plate can be inserted into the case with its bent margins tending to engage the sides of the case and provide a snug closure upon the sides of the case.

The deflector plate, as will be more fully apparent in the description hereinafter with reference to the drawings, has two principal functions, the first of which is to form a chimney in the case for channeling convective flow of air through the aperture in the front of the case below the plate about the ultra-violet source and then out through the aperture at the top of the case, such convective flow being induced by the heat release produced within the case by the ultra-violet generator. Secondly, and of no lesser importance, the deflector plate affords a deflecting screen to prevent direct observation of the ultra-violet light generated in the case. In this connection it will be noted that the preferable construction involving the employment of reentrant wings along the side margins of the plate also aids in forming a chimney about the ultra-violet light generator reducing the cross-sectional area of chimney to confine the convective flow of air through the case more closely about the ultra-violet generator and thus produce more efficient ozone generation.

Also, in accordance with my invention the front of the case is preferably covered with a foraminous plate, first to prevent physical contact with the electrical connections which are required for the ultra-violet generator and secondly further to inhibit the possible direct exposure to ultra-violet light.

For a more complete understanding of the practical application of my invention reference is made to the appended drawings in which:

FIGURE 1 is an isometric view of an ozonizer constructed in accordance with my invention;

FIGURE 2 is a front elevation of such ozonizer with the front cover panel removed;

FIGURE 3 is a vertical section taken at line 3—3 in FIGURE 2;

FIGURE 4 is a horizontal section taken at line 4—4 in FIGURE 3;

FIGURE 5 is an isometric view of the portion of the apparatus; and

FIGURE 6 is a fragmentary corner view of the front cover plate of the apparatus.

Referring to the drawings the reference number 10 designates an ozonizer constructed in accordance with my invention which basically includes a case 11, a ballast 12, a pair of ultra-violet lamps 13, a deflector plate 14 and a front cover plate 15.

Referring more particularly to FIGURES 2, 3, 4 and 5, deflector plate 14 which is constructed of thin aluminum or similar material which is preferably die stamped from flat sheet stock, is provided with an integral right-angled, rearwardly-turned ledge 16 at its lower end and with rearwardly bent side margins to form wings 17, ledge 16 being substantially horizontal when the center of plate 14 is vertical while wings 17 form abuse dihedral angles with the center of plate 14.

Ledge 16 is mounted to one side of an angle bracket 18 by means of rivets 19 which also serve to secure the bases of a pair of lamp sockets 20 on the upper surface of ledge 16. The other side angle bracket 18 depends downwardly, generally aligned with the plane of the center of plate 14 and is riveted by means of rivets 21 to the outer side of a U-shaped bracket 22 which receives and secures the core frame of ballast 12. Sockets 20 are upstanding and receive ultra-violet lamp bulbs 13 side by side such that bulbs 13 are centrally positioned adjacent the center portion of plate 14.

The assembly of ballast 12, bulbs 13 and plate 14 is mounted as a unit in case 11, case 11 being a vertically upstanding case of generally rectangular shape having a bottom 23, back 24, sides 25 and top 26 molded as an integral unit of suitable, electrically non-conducting material, such as a phenol-formaldehyde resin, preferably with bosses 27 formed in the four corners between bottom 23, sides 25 and top 26. Bosses 27 are provided with tapped openings facing the front of case 11. Case 11 in its upper center portion of its back is preferably provided with a keyhole (not shown) to permit the case to be secured on a wall hook or screen mounting and with felt pads on the underside of its bottom 23 so that case 11 can be positioned on horizontal surfaces without marring them.

The assembly of lamps 13, plate 14 and ballast 12 is mounted in case 11 resting on bottom 23 with plate 14 adjacent the open front of case 11. In inserting the assembly of lamps, ballast and deflector plate into case 11, wings 17 are compressed lightly toward each other to permit plate 14 to pass between the sides 25 of case 11. Upon being released wings 17 are resiliently urged into contact with the inner surfaces of sides 25 providing a snug fit of the assembly within case 11. Bottom 23 is suitably apertured to permit screws 28 to extend upwardly through bottom 23 and through suitable apertures in bracket 22 such that the assembly of bulbs 13, plate 14 and ballast 12 can be secured by nuts 29 received on screws 28 and held firmly in position in case 11.

It should be noted that lamps 13 are connected in series and in series with ballast 12 in a conventional manner and connected to a power cord 30 for connection to a household electrical power receptacle and back 24 being suitably apertured to permit cord 30 to extend from case 11.

Ozonizer 10 is completed by a rectangular, foraminous, front cover plate 15 which is apertured at its corners to receive screws 31 which are engaged in tapped openings in the end of bosses 27 facing the open front of case 11.

In usage, when lamps are energized, the heat produced by ballast 12 which typically consumes one watt and by lamps 13 each of which typically consumes four watts is adequate to heat the air confined within case 11 and produce a convective flow of air upwardly through case 11 past lamps 13 such that fresh air is constantly brought through case 11 to expose the air to the energizing radiation of the lamps and thus produce ozone in quantities sufficient for sanitizing and deodorizing any normally sized room, such as a kitchen, living room or the like.

In addition, where the construction is as described above, the relatively dark phenol-formaldehyde resin surface on the interior of case 11 reflects some radiation from lamps 13 which is faintly visible through the upper portion of foraminous front cover 15, and hence ozonizer 10 can conveniently also function as a night light. It will be noted, however, referring to FIGURE 6 that preferably the construction of plate 15 is of flat sheet stock provided with small pinholes 32 rather than an open grid construction in order to avoid inadvertent direct viewing of the bulbs angularly down through the upper portion of plate 15.

I claim:

1. An ozonizer having an ultra-violet light radiating device and a ballast, said radiating device mounted on said ballast, the improvement which comprises a housing for said ozonizer which includes and upstanding case having a closed bottom, back, sides and top and having an open front, said ballast being mounted on the inside of the bottom of said case, a deflector plate mounted on said ballast with said radiating device positioned behind said deflector plate, said deflector plate extending across said case adjacent the front of the case with the side edges of the deflector plate bent rearwardly and in contact with the interior of the sides of the case, said deflector plate defining an opening into said case below said plate and an opening into the said case above said plate, said deflector plate forming a chimney which channels a convective flow of air through the lower opening, about the ultra-violet radiating device and out the upper opening, said convective flow of air being induced by heat release produced by the ultra-violet radiating device and ballast and said deflector plate further providing a deflecting screen which substantially prevents direct observation of the ultra-violet radiating device.

2. A housing according to claim 1 which further includes a foraminous front cover plate secured across the open front of said case.

References Cited by the Examiner
UNITED STATES PATENTS

| 2,680,813 | 6/1954 | Doyle | 250—43 |
| 2,702,862 | 2/1955 | Finney | 250—43 |
| 2,732,501 | 1/1956 | Blaeker | 250—43 |
| 3,047,718 | 7/1962 | Fleming et al. | 250—43 |

RALPH G. NILSON, *Primary Examiner.*

W. F. LINDQUIST, *Assistant Examiner.*